United States Patent

Crespo et al.

[11] 4,038,914
[45] Aug. 2, 1977

[54] DEVICE FOR USE IN SEPARATING COFFEE BREWERS WHICH ARE IN TWO SCREW-THREADED PORTIONS

[76] Inventors: Osmundo Crespo, 1938 SW. 22nd Terrace, Miami, Fla. 33145; Carmen Sophia Carratala, 4701 NW. 4 St., Miami, Fla. 33126

[21] Appl. No.: 631,818

[22] Filed: Nov. 14, 1975

[51] Int. Cl.² .............................. A47J 31/00
[52] U.S. Cl. ........................... 99/279; 248/346
[58] Field of Search .............. 99/279, 275, 284, 296, 99/306, 316–317; 220/4 B, 4 E; 248/346, 362–363, 425, 453; 15/164

[56] References Cited

U.S. PATENT DOCUMENTS

| 1,932,109 | 10/1933 | Judson | 248/362 X |
| 2,049,365 | 7/1936 | Follett | 15/164 |
| 2,665,872 | 1/1954 | DeWitt | 248/362 |
| 2,675,754 | 4/1954 | Huck | 248/346 X |
| 2,711,765 | 6/1955 | Pecoraro | 248/362 X |
| 2,750,769 | 6/1956 | Yost et al. | 248/362 X |
| 2,963,256 | 12/1960 | Borah | 248/346 |

FOREIGN PATENT DOCUMENTS

| 1,162,087 | 3/1958 | France | 220/4 B |

Primary Examiner—Harvey C. Hornsby
Assistant Examiner—Arthur O. Henderson

[57] ABSTRACT

This invention is of a tool for use in separating a coffee brewer of the type which includes a screw thread connected upper and lower portion and which tool comprises a socket sized to receive the bottom of the lower portion of the coffee brewer and means to secure the tool to a table, such as by suction cups which are fastened to the bottom of the tool.

2 Claims, 3 Drawing Figures

DEVICE FOR USE IN SEPARATING COFFEE BREWERS WHICH ARE IN TWO SCREW-THREADED PORTIONS

FIELD OF THE INVENTION

This invention relates to a tool for use in separating a coffee brewer of the type which includes an upper and lower portion which are in screw threaded engagement and which are sometimes difficult to remove.

BACKGROUND OF THE INVENTION

As is perhaps well known, many people prefer to brew their coffee in the various devices which are used to brew coffee which is known as "Expresso" coffee. Such containers usually contain an upper portion and a lower portion which are in screw-threaded engagement. The lower portion is often, as seen in bottom plan view, of an equi-angle polygon, that is the side walls adjacent the bottom define equi-angles between sides walls of a polygon. The invention comprises a socket which is matingly sized to receive the lower portion of the coffee brewer and resist turning of it relative to the tool. The tool in turn includes means to attach it to a table top, such as by suction cups, so that, turning or torque applied to the upper portion of the coffee brewer will readily cause the screw-threaded engagement to be broken so that the upper and lower portions of the coffee brewer can be easily separated; and, thereafter, the lower portion is simply lifted out of the receptacle of the tool.

In accordance with these and other objects which will become apparent hereinafter, the instant invention will now be described with reference to the accompanying drawing in which:

DESCRIPTION OF PREFERRED EMBODIMENT

Figure 1:
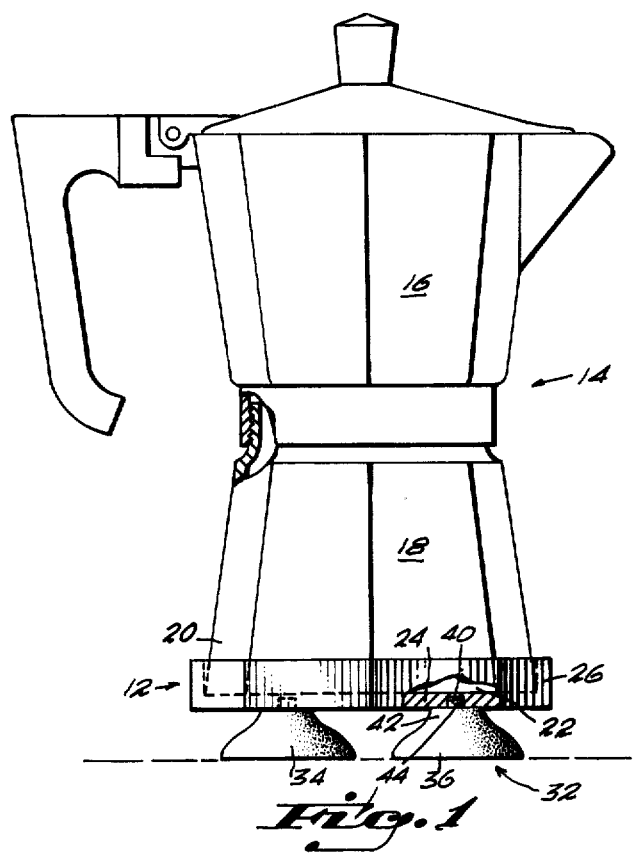
FIG. 1 is a side elevational view of a coffee brewer of the type which includes a screw thread connected upper and lower portion seated in the tool device of the present invention.
Figure 2:
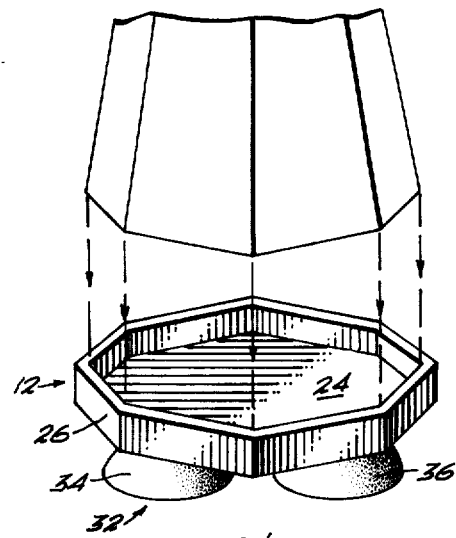
FIG. 2 is a bottom plan view of the tool device.
Figure 3:
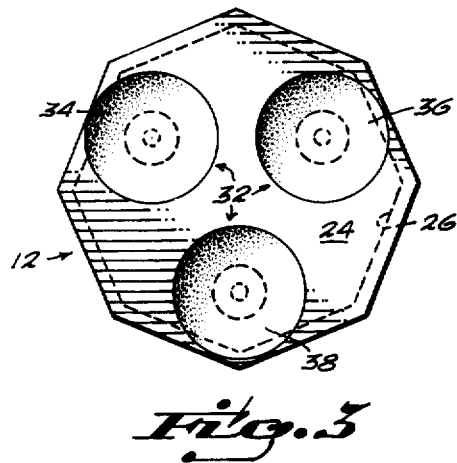
FIG. 3 is a fragmentary exploded perspective view of the bottom portion of a coffee pot in relation to the tool device.

This invention relates to a tool 12 for use in separating a coffee brewer 14 of the type which includes an upper and lower portion 16 and 18 in screw-threaded engagement with one another and the lower portion of which is characterized by a side wall 20 adjacent the bottom or floor 22 of the lower portion wich, as seen in bottom plan view, is an equi-angle polygon, such as a hexagon, pentagon, or other type polygon.

The tool 12 comprises a member which, in general, is a flat plate portion 24 having an upstanding peripheral side wall 26 in connected portions which are of equi-length and which define equi-angle junctures therearound and which mates with the bottom of the lower portion of the coffee brewer. In use, the coffee brewer is merely nested in the receptacle defined by the plate and the upstanding members and the upper member can then be turned by the handle so that the upper and lower portions can be separated.

Means 32 are provided to attach the member to a surface; and, in the embodiment shown, these means comprise a plurality of suction cups, 34, 36, 38, each of which has an upstanding threaded stud 40, the lower end of which is captivated in a hub 42 of the suction cup and the upper end 44 of which is in screw-threaded engagement with a threaded bore in the bottom of the member, which does not extend completely through the plate.

It is thus seen that, in use, the member may be positioned on a table, pressed downwardly, to actuate the suction cups and, thereafter, when the coffee brewer is positioned into the mating receptacle of the member, the handle may be utilized to unscrew the top member. This is an important advantage because it is often difficult to separate the upper and lower portions of a coffee brewer.

What is claimed is:

1. In combination, a coffee brewer including an upper portion and a lower portion and screw-thread means interconnecting the upper and lower portion, said lower portion having a bottom and including a plurality of upstanding peripheral walls extending from the bottom which, forms as seen in bottom plan view, an equi-angle polygon, and a receptacle member having a plurality of upstanding walls corresponding to said bottom portion and defining a mating receptacle to nest the bottom with the upstanding walls of the receptacle member in close adjacent relation to the upstanding peripheral side walls extending upwardly from the bottom of said lower portion, and means to fix the receptacle member to a surface comprising a plurality of suction cup means, said mating walls permitting the upper and lower portion of the brewer to be separated from one another by rotating the upper portion and lower portion of the coffee brewer relative to one another, said separation accomplished by pressing the coffee brewer downwardly in the receptacle and, simultaneously, the upper portion of the coffee brewer is rotated about a vertical axis through the coffee brewer and receptacle member, said coffee brewer including a handle extending radially of the upper portion for lifting the upper portion and, also, for applying torque to the upper portion to rotate it relative to the lower portion.

2. The device as set forth in claim 1 wherein said suction cup means includes threaded studs extending from said suction cups and said bottom having threaded recesses companionately sized for threaded engagement with said threaded studs for retaining said suction cups on said bottom in spaced relation from one another.

* * * * *